United States Patent [19]

Shai

[11] 4,111,851

[45] Sep. 5, 1978

[54] ELECTRICALLY CONDUCTIVE THERMAL CONTROL COATINGS

[75] Inventor: Michael Charles Shai, Gambrills, Md.

[73] Assignee: The United States of America as represented by the Administrator of the National Aeronautics and Space Administration, Washington, D.C.

[21] Appl. No.: 844,344

[22] Filed: Oct. 21, 1977

[51] Int. Cl.$^2$ .......................... H01B 1/08; C09D 1/02
[52] U.S. Cl. ...................................... 252/518; 106/84; 106/296
[58] Field of Search ................... 106/84, 296; 252/518

[56] References Cited

U.S. PATENT DOCUMENTS

| | | | |
|---|---|---|---|
| 3,538,022 | 11/1970 | Bowman | 106/296 |
| 3,541,029 | 11/1970 | Bowman | 106/296 |
| 3,551,356 | 12/1970 | Bowman | 106/296 |
| 3,576,656 | 4/1971 | Webb | 106/296 |
| 3,769,050 | 10/1973 | Terry et al. | 106/296 |

*Primary Examiner*—James Poer
*Attorney, Agent, or Firm*—Robert D. Marchant; John R. Manning; John O. Tresansky

[57] ABSTRACT

A coating characterized by low thermal absorption, high thermal emittance and high electrical conductivity comprises:
(a) a fired oxide pigment comprising a minor amount of aluminum oxide and a major amount of zinc oxide;
(b) a vehicle-binder comprising an alkali metal silicate; and
(c) sufficient water to provide a mixture suitable for application to a substrate.

The fired oxide pigment may further include a minor amount of cobalt oxide. The resulting coating is particularly useful for coating the surfaces of spacecraft and similar objects.

14 Claims, No Drawings

ELECTRICALLY CONDUCTIVE THERMAL CONTROL COATINGS

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention relates to a coating characterized by low thermal absorption, high thermal emittance and high electrical conductivity. More particularly, this invention relates to a coating characterized by the above-stated properties which comprises a fired oxide pigment and which is useful for coating the surface of spacecraft and similar objects.

One of the requirements for long-term operation of space vehicles is the provision of a thermal control coating which will avoid charge build-up due to ionic or electric fields such as the "Solar Wind" and radiation belts. Such a coating should provide control and selectivity of optical absorptance and emittance properties and provide stability of these properties to exposure by UV radiation as well as to exposure by various ionizing radiations such as electrons, protons, X-rays, and cosmic rays which might be encountered in space environments.

Previously used thermal control coating systems used on spacecraft include organic paints, inorganic paints, polished metal surfaces, evaporated metals and oxides, and second surface mirrors. Of these, all are non-conductive except the metals and evaporated metals. Such coating systems have been found unsuitable for most parts of spacecraft because of their low emittance values which result in unacceptably high operating temperatures.

In addition to these coating systems, metallic cages have been used in some cases to shield a sensitive component from electrical fields. However, such cages not only are expensive because they must be custom fabricated, but also are unwieldy, add excessive weight, and are limited in thermal control properties.

One approach to spacecraft thermal control is to use a silicate-treated ZnO. A coating composition of this type is prepared by a method which includes treating ZnO with an aqueous alkali metal silicate solution and combining the treated pigment with a degradation-resistant binder such as a silicone polymer. The silicate treatment was found to render the ZnO pigment resistant to degradation of reflective properties upon exposure to UV radiation in a vacuum. In another approach the zinc oxide is rendered shock-resistant by heat-treatment at a temperature of 600°-900° C.

None of these prior art coatings, however, provide an electrically conductive coating which meets the requirements outlined above. However, as a result of these deficiencies, the present inventor began a study to discover a thermal control coating having the properties described above.

One attempted route was to make available paint systems conductive by the addition of metallic powders. However, the amount of a metallic additive is limited by the required physical properties of the paint, such as flow or spray qualities and the drying, curing and adhesion properties. As a result, it was not possible to meet the requirements for conductivity. Also, reproducibility of electrical and optical properties was found to be poor.

SUMMARY OF THE INVENTION

It is therefore an object of this invention to provide an electrically conductive, thermal control coating for spacecraft and similar objects characterized by low thermal absorption, high thermal emittance and high electrical conductivity.

Another object of the invention is to provide an electrically conductive, thermal-control coating having stable thermal absorption and emittance upon exposure to UV radiation as well as to various ionizing radiations.

Still another object is to provide a coating which is non-flammable.

Other objects and advantages of the present invention will become apparent as the description thereof proceeds.

To obtain these and other objects and advantages which will be apparent from the following, the present invention provides a coating characterized by low thermal absorption, high thermal emittance and high electrical conductivity which comprises:

(a) a fired oxide pigment comprising a minor amount of aluminum oxide and a major amount of zinc oxide, (b) a vehicle-binder comprising an alkali metal silicate, and (c) sufficient water to provide a mixture suitable for application to a substrate. The fired oxide pigment may further comprise a minor amount of cobalt oxide.

DESCRIPTION OF THE PREFERRED EMBODIMENTS

As pointed out above, the present invention is concerned with a coating which has been found particularly useful as a paint for spacecraft, the coating being characterized by low thermal absorption, high thermal emittance and high electrical conductivity. According to the present invention, it has been found that a coating or paint of this type is provided which is based on the use of certain fired oxide pigments in combination with particular emphasis on the use of a minor amount of $Al_2O_3$ and a major amount of zinc oxide. It has been found that formulations containing these fired oxides exhibited stable optical properties after exposure to 1000 equivalent sun hours at 5 solar constant, these UV degradation tests being conducted using a mercury lamp source.

In general, in its broadest embodiment, the coating of the present invention comprises a formulation which includes a pigment of a fired oxide, the pigment containing a minor amount of aluminum oxide and a major amount of zinc oxide. In the most preferred embodiment, the pigment comprises about 0.8 to 2.0 weight percent of aluminum oxide and about 98-99.2 weight percent zinc oxide based on the weight of the pigment. With these two essential components, the resulting coating is a yellow coating or paint. The pigment portion of the coating comprises these components in their fired form as it has been found that the fired mixture of zinc oxide and aluminum oxide provides the necessary electrically conductive coating.

In a further embodiment of the present invention, the fired oxide pigment portion may also contain a minor amount of cobalt oxide, also known as cobalt black. The minor amount of cobalt oxide is preferably in the range of up to about 20 weight percent, and more preferably in the range of about 0.25 to 3.0 weight percent, based on the total weight of the pigment. When cobalt oxide is included in the pigment, the resulting coating is a green coating.

The particle size of the pigment is preferably in the range of about one up to about 177 microns.

A second important part of the coating comprises the vehicle binder. The vehicle binder according to the present invention is preferably an alkali metal silicate or mixture of alkali metal silicates. In general, the vehicle binder is an alkali metal silicate selected from the group consisting of lithium, potassium, and sodium silicates as well as mixtures thereof. The preferred silicates have an alkali metal oxide to silicon dioxide ratio in the range of about 10–30 weight percent. The silicate vehicle binder may be provided by the alkali metal silicate materials per se or may be provided by an existing white paint which contains the proper amount of alkali metal silicates therein.

In general, the formulation of the coating contains about 20–30 weight percent of the vehicle binder in admixture with about 70–80 weight percent of the pigment. The preferred weight ratio of the vehicle binder/pigment is in the range of about 25:75.

The cobalt oxide added to the pigment as an optional ingredient has been found to improve the stability of the optical properties against ultraviolet light and solar wind degradation without adversely affecting the electrical conductivity of the resulting composition.

When formulating the composition, it is usually necessary to add a small amount of water in the range of up to about 5 weight percent in order to provide a mixture suitable for having the proper flowability and viscosity for application to the substrate.

The relative quantities of ZnO and cobalt oxide in the mixture determine the optical properties of the coating, and allow for variations in absorptance values $[\alpha]$ to meet varying thermal control requirements. A preferred absorptance value of 0.60 is achieved with a mixture of 98.0 wt% ZnO, 1.0 wt% $Al_2O_3$ and 1.0 wt% cobalt oxide. A very preferred pigment is obtained by blending this mixture with an equal amount by weight of a mixture of 99.0 wt% ZnO and 1.0 wt% $Al_2O_3$. Exemplary methods for preparing fired oxide pigments of this preferred blend, as well as other blends, are set forth in detail below.

The following chart illustrates the affect of varying the percentage of cobalt oxide in the pigment relative to the optical and electrical properties of coatings formulated in accordance with this invention. All coatings were formulated with both potassium and sodium silicates, with 3 parts pigment being used to one part silicate. All percentages are by weight.

TABLE

| Coating | ZnO wt% | $Al_2O_3$ wt% | Cobalt wt% | Absorptance $\alpha$ | Emittance $\epsilon$ | Area * Resistance $\rho d(ohm-m^2)$ |
|---|---|---|---|---|---|---|
| A | 99 | 1 | — | .38 | .90 | $1.7 \times 10^3$ |
| B | 98.9 | 1 | .1 | .45 | .89 | $1.7 \times 10^3$ |
| C | 98.75 | 1 | .25 | .52 | .87 | $<1.7 \times 10^3$ |
| D | 98.5 | 1 | .5 | .58 | .87 | $<1.7 \times 10^3$ |
| E | 98.4 | 1 | .6 | .585 | .87 | $<1.7 \times 10^3$ |
| F | 98.25 | 1 | .75 | .59 | .87 | $<1.7 \times 10^3$ |
| G | 98.0 | 1 | 1.0 | .63 | .87 | $<1.7 \times 10^3$ |
| H | 96.0 | 1 | 3.0 | .68 | .87 | $<1.7 \times 10^3$ |

* All measurements were made in a vacuum ($1 \times 10^{-5}$ TORR) after the coatings were exposed to a vacuum for 24 hours.

A coating satisfying the following specifications is, for the purposes of this invention, especially preferred as a satellite or spacecraft coating: absorptance ($\alpha$) of 0.60, emittance ($\epsilon$) of 0.85 and area resistance of $3 \times 10^3$ ohm-$m^2$ after being simultaneously exposed to 5300 hours ES (UV) and $4 \times 10^{16}$ protons/$cm^2$ of 5 Kev energy. Such properties are preferred with respect to providing low thermal absorption, high thermal emittance, and high electrical conductivity.

A preferred formulation for a green coating of this invention contains the most preferred pigment detailed above, that is, a mixture of 98.0 wt% ZnO, 1.0 wt% cobalt oxide and 1.0 wt% $Al_2O_3$ blended with an equal amount by weight of a mixture of 99.0 wt% ZnO and 1.0 wt% $Al_2O_3$, from which the fired oxide pigment is prepared, and further contains as the vehiclebinder, a sodium or potassium silicate, and 5 wt% water, with the weight ratio of pigment to vehicle binder being about 75:25. Obviously the color of the coating may be varied as desired, green, white and yellow being preferred.

Suitable methods for preparing the electrically conductive fired oxide pigment of the present invention will now be set forth. Desired amounts of the pigments are selected, weighed and stirred together for about 6 hours. Enough water is added to the mixture to impart a creamy consistency during the stirring. The stirred mixture is dried in an oven at approximately 100° C. and then allowed to cool. The dried mixture is broken up with a hand mortar and pestle and placed into OOA Coors crucible in 50 gram batches. Each batch is fired at approximately 1175° C. for approximately 15 minutes in a furnace which is preheated and then cooled to room temperature. Thereafter, a suitable amount of the fired mixture is placed into the mortar of an electric mortar-pestle and ground for several minutes, i.e., approximately 52 minutes. Finally, the ground powder is passed through a 250 micron sieve. The powder that passes through the sieve is used in formulating the coating.

The conductive coatings of this invention may be prepared using either of the following preparative methods.

Method A

To one part by weight of a lithium potassium silicate solution containing equal parts of a lithium silicate solution having a solids content of 4.0% wt $Li_2O$ and 23.0% $SiO_2$ and a potassium silicate solution having a solids content of 11.3% wt $K_2O$ and 23.7% wt $SiO_2$, there is added three parts by weight of the fired oxide pigment of this invention which has been prepared as detailed above. The solution is placed in a container, preferably a polyethylene bottle, and rolled on a jar mill roller for approximately 1 hour. To the solution add two parts by weight of white silicate paint containing 55.5% wt $K_2SiO_3$, 16.7% wt ZnO, 11.1% wt $Al_2O_3$, and 16.7% wt $TiO_2$ and roll for an additional 2 hours and allow the coating to stand overnight. Prior to application, the coating is rolled for an additional two hours.

Method B

To one part by weight of a silicate vehicle-binder, there is added three parts by weight of the fired oxide pigment of this invention prepared as detailed above. The mixture is placed in a container, preferably a polyethylene bottle, and rolled on a jar mill roller for approximately two hours and allowed to stand overnight. Prior to application, the coating should be rolled for an additional 2 hours. Up to 5 wt% (measured with respect to the total coating prepared) of distilled or deionized water may be added for thinning to achieve proper spray viscosity.

The following examples are presented to illustrate the invention, but it is not considered to be limited thereto. In the following examples, and throughout the specification, parts are by weight unless otherwise indicated.

EXAMPLE 1

Beginning with a fired oxide pigment containing 99.0 wt% ZnO and 1.0 wt% $Al_2O_3$, and following the procedure of Method A, there was obtained a white coating containing this pigment, the vehicle-binder containing 11.3 wt% $K_2O$ and 23.7 wt% $SiO_2$, and containing 5% water. This coating has an absorptance of 0.20, an emittance of 0.92, and an area resistance of $1.0 \times 10^5$ ohm-m$^2$.

EXAMPLE 2

Beginning with a fired oxide pigment prepared from equal parts by weight of a mixture of 98.0 wt% ZnO, 1.0 wt% $Al_2O_3$, and 1.0 wt% cobalt oxide, and a mixture of 99.0 wt% ZnO and 1.0 wt% $Al_2O_3$, and following the procedure of Method B, there was obtained a green coating containing this pigment, a sodium silicate binder, and 5% water. The sodium silicate binder had a weight ratio of $SiO_2$ to $Na_2O$ of 2.50:1 and contained 10.6 wt% $Na_2O$ and 26.5 wt% $SiO_2$. This coating has an absorptance of 0.57, an emittance of 0.89 and an area resistance of $2 \times 10^3$ ohm-m$^2$.

EXAMPLE 3

Beginning with a fired oxide pigment having the same constituents as set forth in Example 1 and following Method B, there is obtained a coating containing this pigment, a sodium silicate binder, and 5% water. The sodium silicate binder is the same as that used in Example 2. This coating has an absorptance of 0.38, an emittance of 0.90 and an area resistance of $1.7 \times 10^3$ ohm-m$^2$.

EXAMPLE 4

Beginning with a fired oxide pigment having the same constituents as set forth in Example 2 and following Method B, there is obtained a coating containing this pigment, a potassium silicate binder and 5% water. The binder had a weight ratio of $SiO_2$ to $K_2O$ of 1:3.31 and contains 11.3 wt% $K_2O$ and 23.7 wt% $SiO_2$. This coating has an absorptance of 0.57, an emittance of 0.91 and an area resistance of $6 \times 10^4$ ohm-m$^2$.

EXAMPLE 5

Beginning with a fired oxide pigment containing 98.75 wt% ZnO, 1.0 wt% $Al_2O_3$ and 0.25 wt% $Co_3O_4$ and following Method B, there was obtained a coating containing this pigment, a sodium silicate binder and 5% water. The binder is the same as that used in Example 2. This coating has an absorptance of 0.52, an emittance of 0.87 and an area resistance of $1 \times 10^3$ ohm-m$^2$.

The coatings of this invention may be applied to substrates including aluminum and mild steel, stainless steel, copper and epoxy fiberglass. In applying the coating of this invention to aluminum and mild steel, it is preferred that all substrates which have been surface-treated (that is, anodized, alodined or irradiated), be avoided unless stripping is possible, that the surface be sand blasted or abraded, and that the surface then be washed with liquid soap, rinsed thoroughly and wiped dry. The substrate is then immersed for about 3 minutes in an acid bath consisting of 11 wt% nitric acid, 1 wt% hydrochloric acid, and 88% distilled water. The immersed substrate is then rinsed with distilled water, wiped dry, and the coating applied. Where immersion is not practical, this step may be omitted and a primer of thin paint with 25 percent water by weight is employed and preferably applied as in applying polish.

Where stainless steel is the substrate, the surface should be sand blasted or abraded and then rinsed with water and dried prior to applying the paint.

When copper is the substrate, the surface is abraded or sand blasted, and the grit is removed from the surface with soap and a water wash. Then the surface is etched for about 3 minutes with a 5–7% glacial acetic acid solution or a 5–7% citric acid solution, rinsed with water and dried, prior to application of the coating.

If epoxy fiberglass is the substrate, the surface is abraded until a rough surface rich in fiberglass is exposed, and the debris is removed with soap and water. The surface is wiped down with a primer of thin paint with 25 percent water by weight and applied to the surface by conventional spraying.

The invention has been described herein with reference to certain preferred embodiments. However, as obvious variations thereon will become apparent to those skilled in the art, the invention is not to be considered as limited thereto.

What is claimed is:

1. A coating characterized by low thermal absorption, high thermal emittance, and high electrical conductivity which comprises:
   (a) 70–80 weight percent of an oxide pigment comprising a minor amount of $Al_2O_3$ and a major amount of ZnO, said pigment being fired at substantially 1175° C. in air for producing a reproducible highly electrically conductive pigment,
   (b) 20–30 weight percent of a vehicle-binder comprising an alkali metal silicate, and
   (c) sufficient water to provide a mixture suitable for application to a substrate.

2. The coating of claim 1 wherein said pigment further contains a minor amount of cobalt oxide.

3. The coating of claim 2 wherein said pigment contains about 98.0–99.2 wt% ZnO, about 0.8–2.0 wt% $Al_2O_3$ and up to 20 wt% of cobalt oxide.

4. The coating of claim 2 wherein said pigment contains about 98.0–99.2 wt% ZnO, about 0.8–2.0 wt% $Al_2O_3$, and about 0.25–3.0 wt% cobalt oxide.

5. The coating of claim 2 wherein said pigment comprises a mixture of 98.0 wt% ZnO, 1.0 wt% cobalt oxide and 1.0 wt% $Al_2O_3$ with an equal amount by weight of a mixture of 99.0 wt% ZnO and 1.0 wt% $Al_2O_3$.

6. The coating of claim 1 wherein said alkali metal silicate is selected from the group consisting of sodium silicate, potassium silicate, lithium silicate, and mixtures thereof.

7. The coating of claim 1 containing up to about 5 wt% of deionized water.

8. The coating of claim 1 containing 25 wt% of said vehicle-binder in admixture with 75 wt% of said pigment, and up to 5 wt% of deionized water.

9. The coating of claim 3 wherein said vehicle-binder is sodium silicate, potassium silicate, or a mixture thereof.

10. The coating of claim 9 wherein the ratio of said vehicle-binder to said pigment is about 25:75.

11. An article of manufacture comprising a substrate coated with the coating of claim 1.

12. An article of manufacture according to claim 11 wherein the substrate is selected from the group consisting of aluminum, mild steel, stainless steel, copper and fiberglass.

13. A highly electrically conductive coating characterized by low thermal absorption with high thermal emittance which comprises:
(a) 70–80 weight percent of an oxide pigment comprising a mixture of substantially 98.0–99.2 weight percent of ZnO, substantially 0.8–2.0 weight percent $Al_2O_3$, and substantially 0.25–3.0 weight percent cobalt oxide and an equal amount by weight of a mixture of substantially 99.0 weight percent ZnO and substantially 1.0 weight percent $Al_2O_3$, said pigment being fired at substantially 1175° C. in air for producing a reproducible highly electrically conductive pigment;
(b) 20–30 weight percent of a vehicle-binder comprising an alkali metal silicate; and
(c) sufficient water to provide a mixture suitable for application to a substrate.

14. A coating for use as a satellite and spacecraft coating which comprises:
(a) 70–80 weight percent of an oxide pigment comprising a mixture of substantially 98 weight percent ZnO, substantially 1.0 weight percent $Al_2O_3$, and substantially 1.0 weight percent Cobalt oxide and an equal amount by weight of a mixture of substantially 99.0 weight percent ZnO and substantially 1.0 weight percent $Al_2O_3$, said pigment being fired at substantially 1175° C. in air for producing a reproducible highly electrically conductive pigment;
(b) 20–30 weight percent of a vehicle-binder comprising an alkali metal silicate;
(c) sufficient water to provide a mixture suitable for application to a substrate; and
(d) said resulting coating being characterised by an absorptance of substantially 0.60, an emittance of substantially 0.85 and an area resistance of substantially $3 \times 10^3$ ohm-$m^2$ when exposed to substantially 5300 hours ES and substantially $4 \times 10^{16}$ protons/$cm^2$ of 5 kev energy.

* * * * *